(No Model.)
W. MORRISON.
FIRE ENGINE.
No. 415,053.  Patented Nov. 12, 1889.
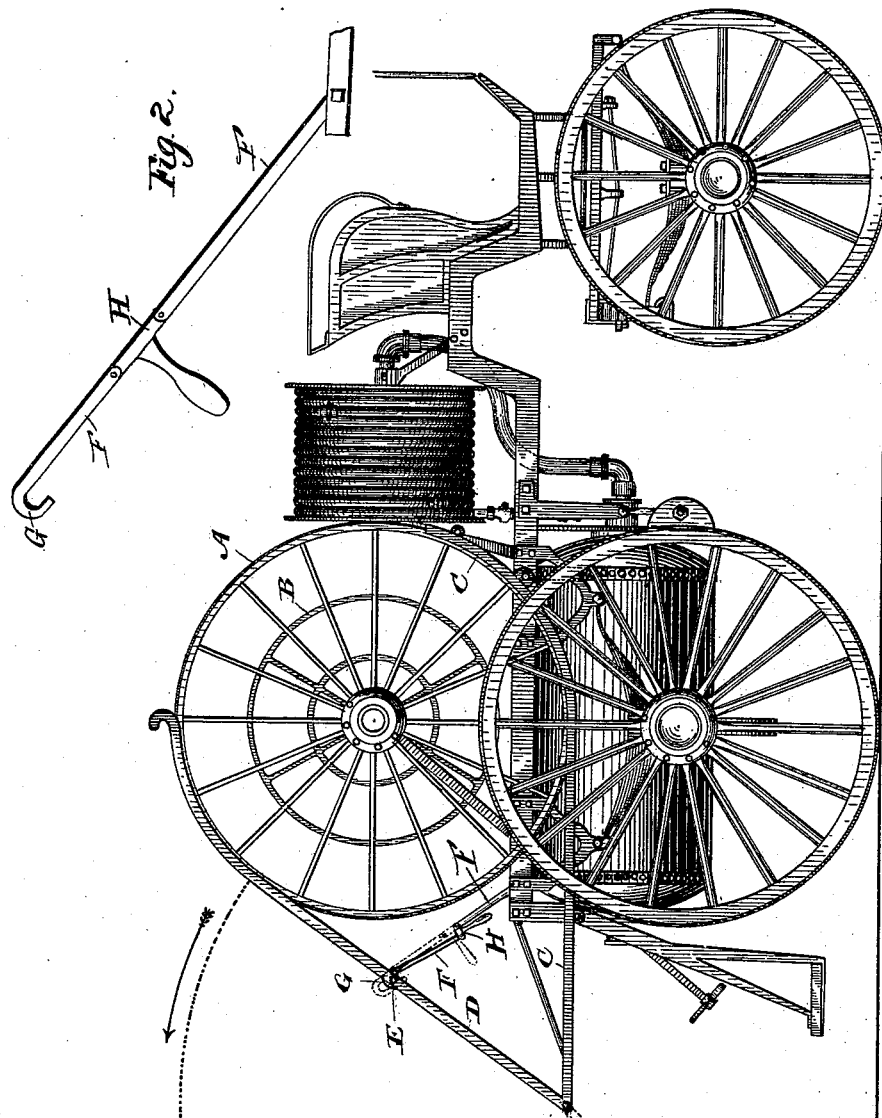
Witnesses.
Inventor

UNITED STATES PATENT OFFICE.

WILLIAM MORRISON, OF TORONTO, ONTARIO, CANADA.

FIRE-ENGINE.

SPECIFICATION forming part of Letters Patent No. 415,053, dated November 12, 1889.

Application filed February 13, 1889. Serial No. 299,759. (No model.)

*To all whom it may concern:*

Be it known that I, WILLIAM MORRISON, manufacturer, of the city of Toronto, in the county of York, in the Province of Ontario, Canada, have invented a certain new and useful Improvement in Chemical Fire-Engines, of which the following is a specification.

The object of the invention is to construct an appliance on the frame of the chemical fire-engine by which a large hose-reel carrying hose suitable for hydrant, steam, or other fire-engine service may be carried and readily lowered to the ground when required for use; and it consists, essentially, of a horizontal track permanently fixed to the frame of the chemical engine, and having a supplemental track hinged to it to form a track by which the hose-reel may be readily guided to the ground when required for use, substantially as hereinafter more particularly explained.

Figure 1 represents a side elevation of a chemical engine arranged to carry a hose-reel. Fig. 2 is a detail of the brace by which the track is secured in order to retain the hose-reel.

As Fig. 1 is merely a side elevation, only one set of wheels and other parts can be seen; but of course it will be understood that the parts I shall refer to are duplicated where necessary.

A represents the wheel of the hose-reel, a corresponding wheel being, of course, on the opposite side of the engine, the two wheels being connected together by a shaft and provided with a suitable reel B.

C is a track, preferably made of channel or angle iron, and rigidly fastened to the frame of the engine. This track C is preferably curved at one end, as indicated, to conform with the circumference of the wheel A, which butts against it, as indicated, when the said wheel is supported on the engine.

D is a supplemental track, with its end arranged to hinge or pivot on the end of the track C. This supplemental track D is shown in the drawings folded up to butt against the wheel A, for the purpose of holding the said wheel firmly in the position indicated, the portion of the track butting against the wheel being curved to conform with the circumference of the said wheel. The track D is also preferably made of channel or angle iron, and is braced to a corresponding track on the opposite side of the engine by a cross-bar E.

F is a brace, (shown in detail in Fig. 2,) and pivoted to the frame of the engine, as indicated. The end of this brace has a hook G formed on it, designed to fit onto the cross-bar E, close to the track D, when the said track is folded up, as indicated in Fig. 1. An adjusting-link H is located in the center of the brace F, for the purpose of shortening it when necessary, in order to draw the track D tightly against the wheel A, and thus hold it rigidly in position.

I do not confine myself to an adjustable link for holding the supplemental track down, as there are many devices which would perform this duty equally as well.

Should the hose-reel be required, I merely lift or remove the hook G off the cross-bar E, fold down the supplemental track D into the position indicated by dotted lines, and thus form a continuous track by which the hose-reel may be easily run down onto the ground and reloaded onto the engine.

The principal advantage I gain by my invention is, that the chemical fire-engine is utilized for conveying a hose-reel, with hose suitable for hydrant, steam, or other fire-engine service, to a fire, and thus two fire appliances are conveyed on a single carriage, thus dispensing with the service of one hose company.

What I claim as my invention is—

1. A chemical fire-engine having a track rigidly fastened to its frame and designed to support the wheels of a hose-reel, in combination with a supplemental track, with its end arranged to hinge or pivot on the end of the rigid track, and designed to form a continuation thereof for the purpose of lowering the hose-reel onto the ground and reloading it onto the engine, substantially as and for the purpose specified.

2. A track C, rigidly fastened to the frame of a chemical engine, and having a supplemental track D hinged to it, in combination with the brace F, provided with a hook G, and means for shortening and lengthening the said brace, substantially as and for the purpose specified.

Toronto, February 1, 1889.

W. MORRISON.

In presence of—
 CHARLES C. BALDWIN,
 CHAS. H. RICHES.